United States Patent [19]

Nagai et al.

[11] Patent Number: 4,757,488

[45] Date of Patent: Jul. 12, 1988

[54] ROTATION CONTROL APPARATUS FOR CONSTANT LINEAR VELOCITY SYSTEM INFORMATION RECORDING DISC

[75] Inventors: Tadao Nagai, Sagamiko; Hirohisa Yamaguchi, Tokyo, both of Japan

[73] Assignee: TEAC Corporation, Tokyo, Japan

[21] Appl. No.: 929,597

[22] Filed: Nov. 10, 1986

[30] Foreign Application Priority Data

Nov. 15, 1985 [JP] Japan .................................. 60-255967

[51] Int. Cl.$^4$ ............................................. G11B 19/24
[52] U.S. Cl. ....................................... 369/50; 360/73; 369/111; 369/240
[58] Field of Search ........................ 360/10.1, 73, 72.2; 369/50, 47, 48, 111, 240, 54, 30, 32, 267, 43

[56] References Cited

U.S. PATENT DOCUMENTS 4,338,683  7/1982  Furukawa .............................. 369/50
4,603,412  7/1986  Yamayaki .............................. 369/50

*Primary Examiner*—Alan Faber
*Attorney, Agent, or Firm*—Ladas & Parry

[57] ABSTRACT

A rotation control apparatus for a CLV system disc sets an initial value based on an address signal reproduced from the CLV system disc and carries out a rotation control by use of the initial value, so that it is possible to carry out the rotation control even with respect to a CLV system disc on which an information signal is only recorded up to an intermediate position within a program region of the disc. An information signal is newly recordable in conformance with the CLV system from a position in a vicinity of the intermediate position where the previous recording had been discontinued.

9 Claims, 2 Drawing Sheets

ROTATION CONTROL APPARATUS FOR CONSTANT LINEAR VELOCITY SYSTEM INFORMATION RECORDING DISC

BACKGROUND OF THE INVENTION

The present invention generally relates to rotation control apparatuses for constant linear velocity system information recording discs, and more particularly to a rotation control apparatus which controls a rotation frequency of a constant linear velocity system information recording disc so that a relative linear velocity between a pickup device and the information recording disc is always maintained constant.

When recording and reproducing an information signal on and from a constant linear velocity system information recording disc (hereinafter simply referred to as a CLV system disc), a rotation control is carried out so that a relative linear velocity between a pickup device and the disc is always constant. At the time of a reproduction, the relative linear velocity can always be maintained constant by carrying out the rotation control so that a value obtained by reproducing a signal which is pre-recorded on the disc and has a constant frequency becomes a regular value. For example, in the case where the information signal pre-recorded on the disc is a video signal, a horizontal synchronizing signal within the video signal is used as the signal having the constant frequency, and bit clock pulses are used as the signal having the constant frequency in the case where the information signal pre-recorded on the disc is a digital audio signal.

On the other hand, at the time of a recording, the signal having the constant frequency is not yet recorded on the disc and it is hence impossible to use such a signal for the rotation control. But the relative linear velocity is determined by a product of the length (circumference) of each track turn on the disc and the rotation frequency. Hence, it is possible to maintain the relative linear velocity constant by controlling the rotation frequency of the disc inversely proportional to a radius at a position on the disc. Conventionally, when recording the information signal from the inner periphery to the outer periphery of the disc, the relative linear velocity is maintained constant by presetting the rotation frequency at an innermost peripheral position where the recording is started and by gradually decreasing the rotation frequency with a predetermined rate proportionally to the radius at each position on the disc.

However, the conventional method of controlling the rotation of the disc at the time of the recording is only effective when continuously recording the information signal throughout the entire recording region on the disc from a recording start position to a recording end position, such as the case where the recording is carried out by a cutting apparatus. In the case where the disc is removed from the recording apparatus by discontinuing the recording of the information signal in the recording region and the recording is resumed after a predetermined time has elapsed by once again loading the disc on the recording apparatus so as to newly record an information signal from a position on the disc where the previous recording had been discontinued, it is impossible to control the relative linear speed according to the conventional method.

SUMMARY OF THE INVENTION

Accordingly, it is a general object of the present invention to provide a novel and useful rotation control apparatus for CLV system disc, in which the problems described heretofore are eliminated.

Another and more specific object of the present invention is to provide a rotation control apparatus for CLV system disc, in which an initial value is set based on an address signal reproduced from the CLV system disc and a rotation control is carried out by use of the initial value. According to the rotation control apparatus of the present invention, it is possible to carry out the rotation control even with respect to a CLV system disc on which an information signal is only recorded up to an intermediate position within a program region of the disc, so that an information signal can be newly recorded in conformance with the CLV system from a position in a vicinity of the intermediate position where the previous recording had been discontinued.

Other objects and further features of the present invention will be apparent from the following detailed description when read in conjunction with the accompanying drawings.

DETAILED DESCRIPTION

Figure 1:
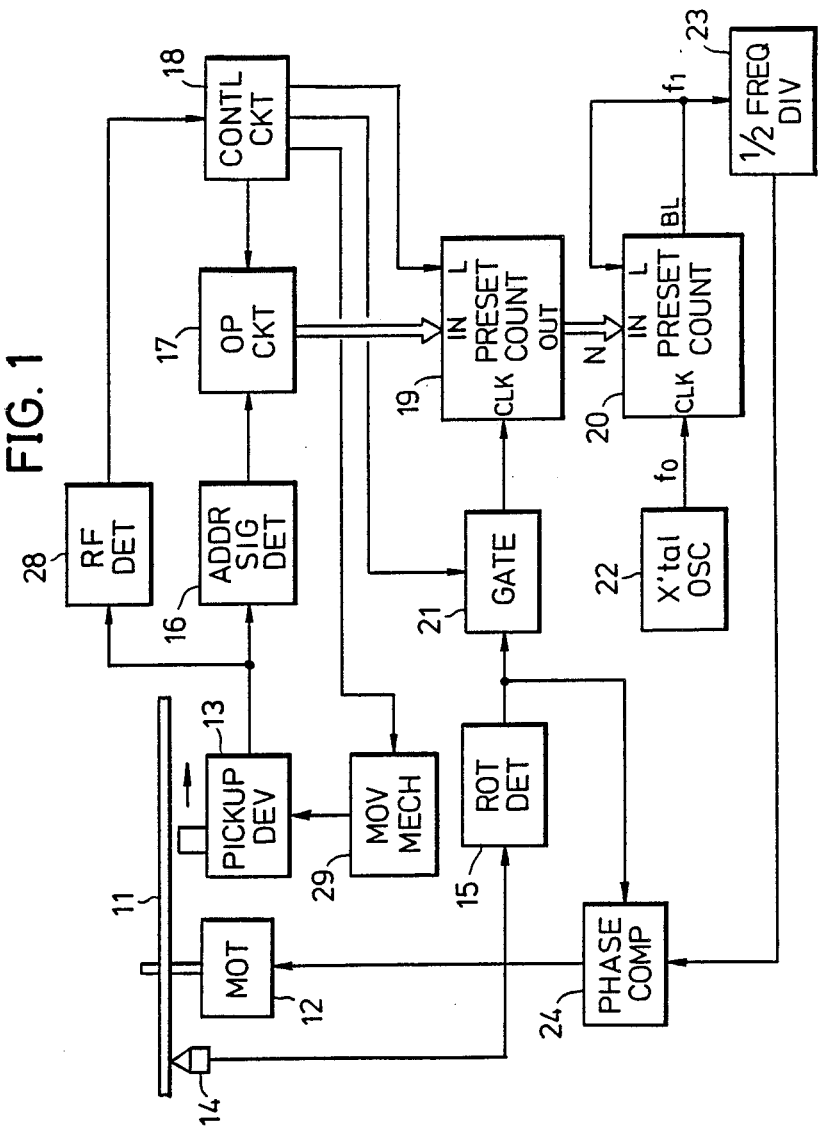
FIG. 1 is a system block diagram showing an embodiment of the rotation control apparatus for CLV system disc according to the present invention.
Figure 2:
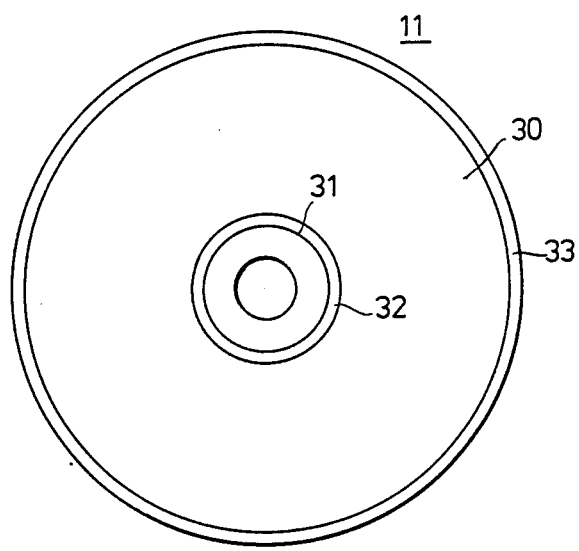
FIG. 2 is a plan view showing the CLV system disc.

FIG. 1 shows an embodiment of the rotation control apparatus for CLV system disc according to the present invention. As shown in FIG. 2, a CLV system disc 11 comprises a program region 30 in which an information signal is to be recorded and reproduced, and one ring-shaped track 31 which is pre-recorded with a rotation control signal having a constant period. The track 31 is formed on the inner peripheral side of the program region 30. A lead-in region 32 is provided between the track 31 and the program region 30, and an address signal is pre-recorded in the lead-in region 32. The address signal indicates a position on the disc and the value thereof is incremented by "1" for every one revolution of the disc 11. It will be assumed that an information signal is pre-recorded on information track turns in a pre-recorded portion of the program region 30 from starting position up to an intermediate position of the program region 30 by a previous recording operation. Furthermore, an address signal which indicates the track position in time, for example, is pre-recorded together with the information signal in this pre-recorded portion of the program region 30. A recording frequency or a time position of this address signal is selected so that the recording frequency of the address signal is different from a recording frequency band of the information signal or the time position of the address signal is different from that of the information signal. A lead-out region 33 is provided on the outer peripheral side of the program region 30.

The disc 11 is rotated by a motor 12. The information signal and the address signal are recorded in the program region 30 of the rotating disc 11 by a light beam emitted from a pickup device 13, and the recorded information signal and the address signal is reproduced from the rotating disc 11 by detecting a change in the intensity of a light beam reflected by the disc 11. On the other hand, the pre-recorded rotation control signal is reproduced from the track 31 by a photo-reflector 14 which detects a change in the intensity of light reflected thereby. The detected rotation control signal from the photo-reflector 14 is supplied to a rotation detecting circuit 15. Since the rotation control signal is pre-recorded with a constant period, a rotation detection pulse signal having a period inversely proportional to a rotation frequency of the disc 11 (that is, the motor 12) is obtained from the rotation detecting circuit 15.

Description will now be given for the case where the recording of the information signal is to be resumed from the intermediate position on the disc 11 where the previous recording has been discontinued. The pickup device 13 is moved over the pre-recorded portion of the program region 30 from the lead-in region 32 and stops at a position immediately before an end position of the pre-recorded portion. The information signal is a frequency modulated signal, for example, and an envelope of a reproduced information signal (FM signal) obtained from the pickup device 13 while the pickup device 13 (strictly speaking, the light beam) is scanning over the pre-recorded portion of the program region 30 has a predetermined level, while no envelope is obtained when the pickup device 13 scans over an unrecorded portion of the program region 30. Accordingly, when there is a large decrease in the level of the envelope detected in an RF detecting circuit 28 and a control circuit 18 detects that no envelope is detected in the RF detecting circuit 28 for a predetermined time, the pickup device 13 is returned to a position immediately before the position where the level of the envelope largely decreases responsive to a control signal which is supplied to a pickup moving mechanism 29 from the control circuit 18. The pickup device 13 reproduces the signal pre-recorded on the information recording track turn at the position immediately before the end position of the pre-recorded portion of the program region 30 in a stop reproduction mode. A reproduced address signal within the signal reproduced by the pickup device 13 is discriminated and separated in an address signal detecting circuit 16 and is supplied to an operation circuit 17. In the case where the information recording track is a spiral track, the pickup device 13 (that is, the light beam) is returned by one track pitch for every one revolution of the disc 11 in the stop reproduction mode. On the other hand, in the case where the information recording track comprises a plurality of concentric tracks, the position of the pickup device 13 is maintained the same in the stop reproduction mode.

The reproduced address signal and a signal from the control circuit 18 are supplied to the operation circuit 17. The operation circuit 17 calculates a present position (radius or distance from a center of the disc 11) of the pickup device 13 (or the light beam) based on the value of the reproduced address signal and obtains an initial value N of the frequency dividing ratio for setting the rotation frequency of the disc 11 to a regular value for the present position. This initial value N is supplied to a first preset counter 19.

The relative linear velocity between the pickup device 13 and the disc 11 can be described by a product of a rotation frequency M and a circumference ($2\pi R$) at a radius R, where M denotes the rotation frequency of the disc 11 (that is, motor 12) when the pickup device 13 is at a position of the radius R. Hence, the rotation frequency M is inversely proportional to the radius R and the following equation (1) stands, where $K_1$ is a constant.

$$M = K_1/R \qquad (1)$$

Figure 3:
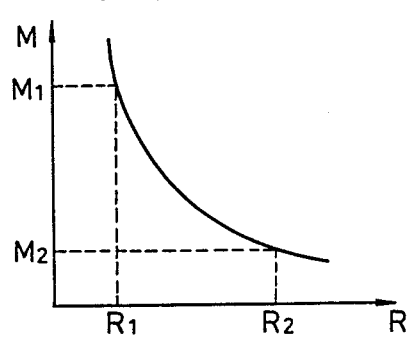
FIG. 3 is a graph showing the relationship between the rotation frequency of the disc and a radial position of a pickup device shown in FIG. 1 on the disc.

The relationship between the rotation frequency M and the radius R in the equation (1) is shown in FIG. 3. In other words, as the pickup device 13 moves from an inner peripheral position of a radius $R_1$ to an outer peripheral position of a radius $R_2$, the rotation frequency M gradually changes from $M_1$ to $M_2$.

On the other hand, an output signal frequency $f_1$ of a second preset counter 20 which will be described later can be described by $f_0/N$, where $f_0$ denotes an output signal frequency of a crystal oscillator 20 which will be described later and N denotes the frequency dividing ratio of the second preset counter 20. Since the rotation frequency M of the motor 12 is controlled proportionally to the output signal frequency $f_1 = f_0/N$ of the second preset counter 20, the following equation (2) stands, where $K_2$ is a constant.

$$M = K_2/N \qquad (2)$$

Hence, the following equation (3) can be derived from the equations (1) and (2).

$$N = (K_2/K_1) \times R \qquad (3)$$

Figure 4:
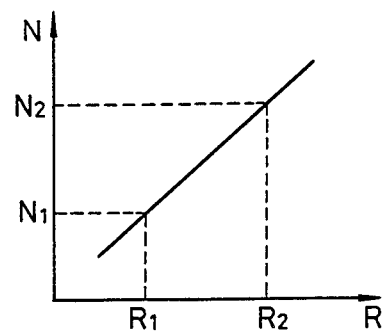
FIG. 4 is a graph showing the relationship between the frequency dividing ratio of a second preset counter shown in FIG. 1 and the radial position of the pickup device on the disc.

The relationship between the frequency dividing ratio N and the radius R is shown in FIG. 4. In other words, as the pickup device 13 moves from the inner peripheral position of the radius $R_1$ to the outer peripheral position of the radius $R_2$, the frequency dividing ratio N linearly increases from $N_1$ to $N_2$, and the output signal frequency $f_1$ of the second preset counter 20 decreases linearly. From the equation (3), it can be seen that it is possible to maintain the relative linear velocity constant by varying the frequency dividing ratio N proportionally to the radius R of the position of the pickup device 13 on the disc 11.

The first preset counter 19 is an up-counter loaded (preset) with output parallel data of the operation circuit 17 which obtains an initial value $N_1$ based on the equation (3) in FIG. 4, for example, when a load pulse is received from the control circuit 18. The loaded data (frequency dividing ratio) in the first preset counter 19 is supplied to the second preset counter 20. The control circuit 18 supplies to a gate circuit 21 a gate pulse simultaneously as when the load pulse is supplied to the first preset counter 19. The closed gate circuit 21 is opened responsive to the gate pulse. The control circuit 18 also supplies a control signal to the moving mechanism 29 so that the moving mechanism 29 starts to move the pickup device 13 in the outer peripheral direction of the disc 11. When the gate circuit 21 is opened, the rotation detection pulse signal from the rotation detecting circuit 15 is supplied to a clock input terminal CLK of the first preset counter 19.

The second preset counter 20 is a down-counter which frequency-divides the output signal of the crystal oscillator 22 by a frequency dividing ratio N which is dependent on the counted value N received from the first preset counter 19. The output signal frequency $f_0$ of the crystal oscillator 22 is 14 MHz, for example. Accordingly, the output signal frequency $f_1$ of the second preset counter 20 becomes $f_0/N$. At first, the second preset counter 20 frequency-divides the output signal of the crystal oscillator 22 by a frequency dividing ratio (for example, $N_1$ shown in FIG. 4) based on the value loaded in the first preset counter 19. The output signal of the second preset counter 20 is supplied to a $\frac{1}{2}$ frequency divider 23 and to a load terminal L of the second preset counter 20. For this reason, the output counted value of the first preset counter 19 is loaded into the second preset counter 20 for every one period of the output signal of the second preset counter 20. Because the first preset counter 19 starts to count up the pulses of the rotation detection pulse signal after the output signal of the operation circuit 17 is loaded into the first preset counter 19, the second preset counter 20 is thereafter loaded with the counted value N described by the equation (3) and shown in FIG. 4.

As a result, as the pickup device 13 is moved in the outer peripheral direction of the disc 11 at a normal speed, the frequency dividing ratio N of the second preset counter 20 increases, and the output signal frequency $f_1$ of the second preset counter 20 gradually decreases. The output signal of the second preset counter 20 is frequency-divided by $\frac{1}{2}$ in the frequency divider 23 having a frequency dividing ratio 2 so as to widen the pulse width of the signal, and an output signal of the frequency divider 23 is supplied to a phase comparator 24. The phase comparator 24 compares the phase of the rotation detection pulse signal from the rotation detecting circuit 15 and the phase of the output signal of the frequency divider 23, and produces a phase error signal which is supplied to the motor 12. The rotation of the motor 12 is controlled responsive to the phase error signal so as to rotate at the rotation frequency proportional to the output signal frequency $f_1$ of the second preset counter 20. Therefore, the rotation frequency M of the motor 12 and the disc 11 decreases as the pickup device 13 moves in the outer peripheral direction of the disc 11 as shown in FIG. 3, and the relative linear velocity between the pickup device 13 and the disc 11 is maintained constant to 9.27 m/sec, for example.

When recording the information signal from the starting position of the program region 30, the address signal pre-recorded in the lead-in region 32 is reproduced. The recording of the information signal is started with the preset rotation frequency of 1609.4 rpm, for example, after the address value of the reproduced address signal coincides with a known last address value in the lead-in region 32. Thereafter, the rotation of the motor 12 is controlled similarly as described before so as to gradually decrease the rotational speed responsive to the signal which is obtained by frequency-dividing the output signal frequency $f_0$ of the crystal oscillator 22 in the second preset counter 20 by a frequency dividing ratio based on the output counted value of the first preset counter 19 which counts the pulses of the rotation detection pulse signal.

In the case where the information signal comprises video and audio signals, the address signal is transmitted within a predetermined interval in a vertical blanking period of the video signal, for example, and the address signal is recorded in a frequency band different from that of the audio signal. The rotation detection pulse signal may be obtained from the disc 11 by reproducing a signal pre-recorded on a guide track when the disc 11 has a configuration previously disclosed in a U.S. patent application Ser. No. 873,407 filed June 12, 1986 in which the assignee is the same as the assignee of the present application. The information signal is recorded on the previously proposed disc at an intermediate part between two mutually adjacent track turns of the guide track which is pre-formed on the disc, and this disc is pre-recorded with a signal having a constant period on each of the track turns of the guide track. In addition, it is possible to obtain the rotation detection pulse signal by a known frequency generator which generates a signal having a frequency dependent on the rotation frequency of the motor 12.

It is also possible to carry out the high-speed search in a reverse direction, that is, in the inner peripheral direction of the disc, so as to find a starting position of the unrecorded portion within the program region 30. In this case, the level of the envelope of the reproduced signal is zero when the pickup device 13 is moving and scanning over the unrecorded portion within the program region 30, but the level of the envelope of the reproduced signal largely increases to the predetermined level when the pickup device 13 scans over the pre-recorded portion within the program region 30. Hence, the address signal within the reproduced signal obtained in the stop reproduction mode when the pickup device 13 is at the position where the level of the envelope largely increases to the predetermined level is discriminated and separated in the address signal detecting circuit 16, and a rotation control similar to that described before is carried out so that the pickup device 13 is moved at the normal speed in the forward direction (outer peripheral direction of the disc) from the starting position of the unrecorded portion within the program region 30.

In the embodiment described heretofore, the disc 11 is an optical disc. However, the application of the present invention is not limited to the rotation control of the optical disc, and may be applied to the rotation control of any type of CLV system disc such as a magnetic disc.

According to the present invention, an address signal is reproduced from the disc, an initial value is set based on a reproduced address signal, and a signal to be used for the rotation control is obtained from a frequency dividing means which has a frequency dividing ratio varied depending on a counted value of rotation detection pulses by starting the count from the initial value. According to the rotation control apparatus of the present invention, it is possible to carry out the rotation control even with respect to a CLV system disc on which the information signal is only recorded up to an intermediate position within a program region of the disc, so that the information signal can be newly recorded in conformance with the CLV system from a position in a vicinity of the intermediate position where the previous recording had been discontinued.

Further, the present invention is not limited to these embodiments, but various variations and modifications may be made without departing from the scope of the present invention.

What is claimed is:

1. A rotation control apparatus for a constant linear velocity system information recording disc which is rotated by a motor, said information recording disc being pre-recorded with an address signal indicative of a position of said information recording disc within a predetermined region thereof, said rotation control apparatus comprising:

rotation detecting means for detecting a rotation of said information recording disc and for generating rotation detection pulses having a period inversely proportional to a rotation frequency of said information recording disc;

a pickup device for recording and reproducing an information signal on and from said information recording disc by scanning said information recording disc;

a moving mechanism for moving said pickup device in a radial direction of said information recording disc;

control means responsive to a signal reproduced from said information recording disc by said pickup device for supplying to said moving mechanism a signal for moving said pickup device to an arbitrary position within said predetermined region and for moving said pickup device at a normal speed after reproducing the address signal in a stop reproduction mode in which one track turn on said information recording disc is scanned repeatedly;

address signal detecting means for detecting a reproduced address signal within the reproduced signal from said pickup device;

operation circuit means for calculating from the reproduced address signal an initial value in accordance with a regular rotation frequency of said information recording disc at said arbitrary position;

an oscillator for generating a signal having a constant frequency;

frequency dividing means for counting said rotation detection pulses by starting from said initial value and for frequency-dividing the output signal of said oscillator by a frequency dividing ratio which successively increases with a counted value; and comparator means for comparing phases of said rotation detection pulses and an output signal of said frequency dividing means and for producing a phase error signal, said phase error signal being supplied to said motor to control the rotation thereof, so that a relative linear velocity between said pickup device and said information recording disc is maintained substantially constant.

2. A rotation control apparatus as claimed in claim 1 in which said information recording disc is pre-recorded with an information signal within said predetermined region together with said address signal, said arbitrary position being located at a terminal portion of said predetermined region.

3. A rotation control apparatus as claimed in claim 1 in which said predetermined region on said information recording disc is a lead-in region in which no information signal is to be recorded and reproduced, said arbitrary position being located at a terminal portion of said lead-in region.

4. A rotation control apparatus as claimed in claim 1 in which the frequency dividing ratio of said frequency dividing means increases linearly to an increase in a radius of a position of said pickup device on said information recording disc.

5. A rotation control apparatus as claimed in claim 1 in which said frequency dividing means generates a signal having a frequency $f_1$ described by $f_1 = f_0/N$, where $f_0$ is the output signal frequency of said oscillator and N is the counted value in said frequency dividing means.

6. A rotation control apparatus as claimed in claim 1 which further comprises a frequency divider for increasing a pulse width of the output signal of said frequency dividing means before being supplied to said comparator means.

7. A rotation control apparatus as claimed in claim 1 in which said frequency dividing means comprises an up-counter for counting up said rotation detection pulses by starting from said initial value, and a frequency dividing circuit loaded with a counted value N of said up-counter for frequency-dividing the output signal of said oscillator by a frequency dividing ratio N which is in accordance with the counted value N and for generating a signal having a frequency $f_1$ described by $f_1 = f_0/N$.

8. A rotation control apparatus as claimed in claim 7 in which said frequency dividing circuit comprises a down-counter for counting down the output signal of said oscillator by starting from the counted value N of said up-counter.

9. A rotation control apparatus as claimed in claim 1 in which said control means supplies to said moving mechanism a signal for moving said pickup device to the arbitrary position within said predetermined region depending on a level change of an envelope of the reproduced signal from said pickup device.

* * * * *